UNITED STATES PATENT OFFICE.

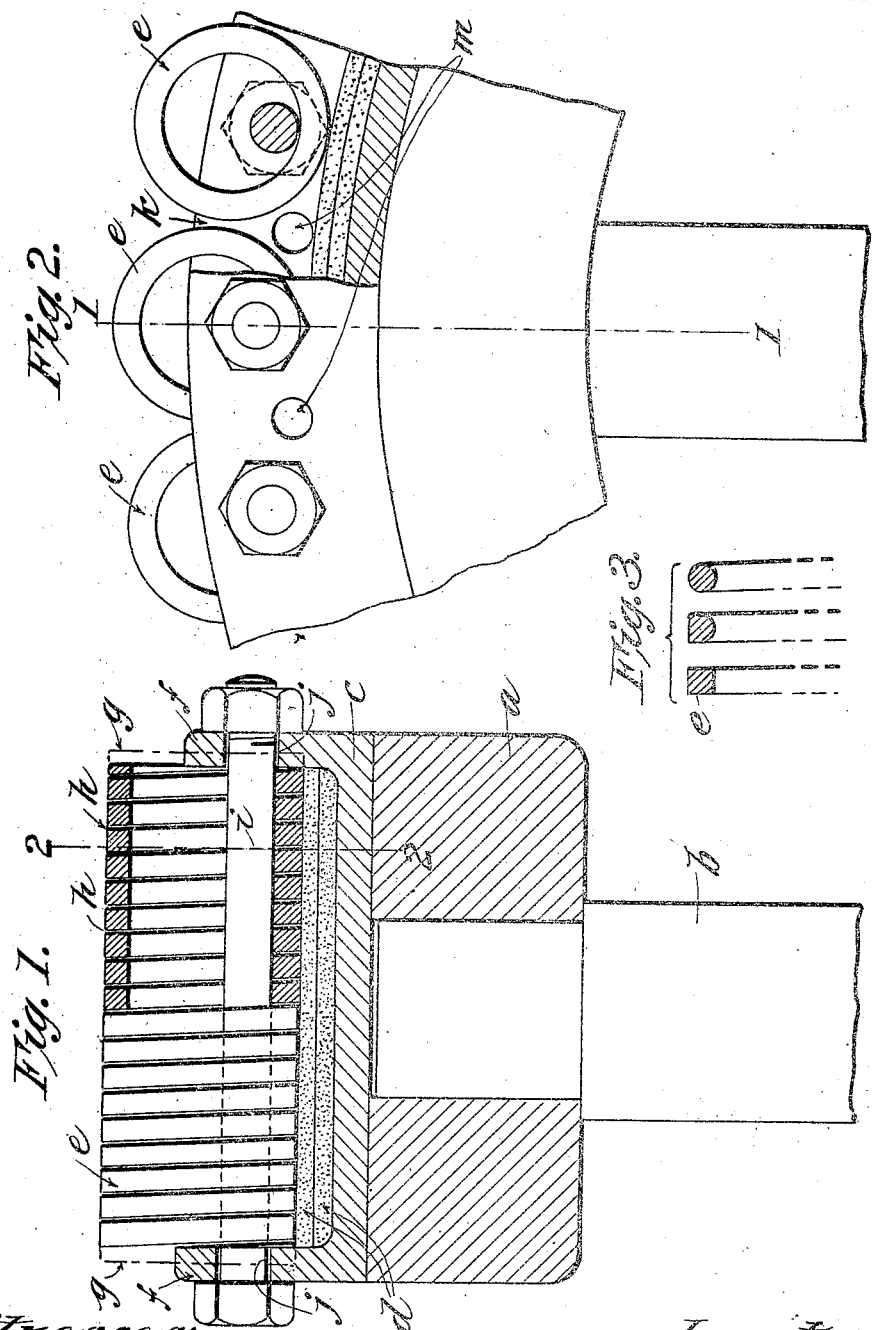

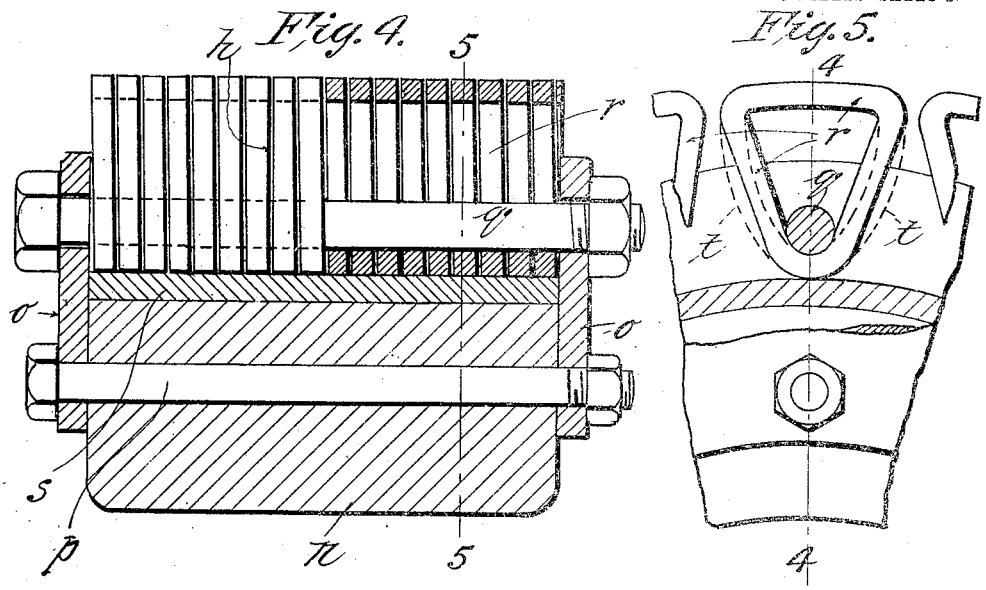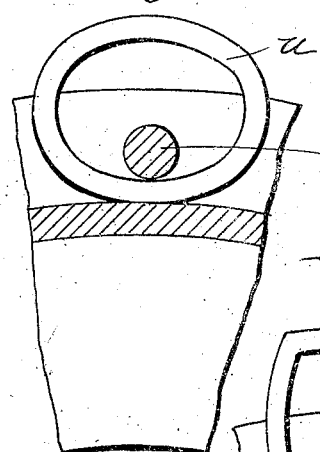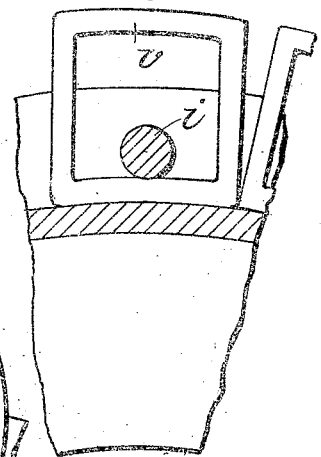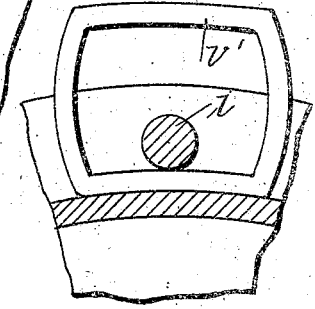

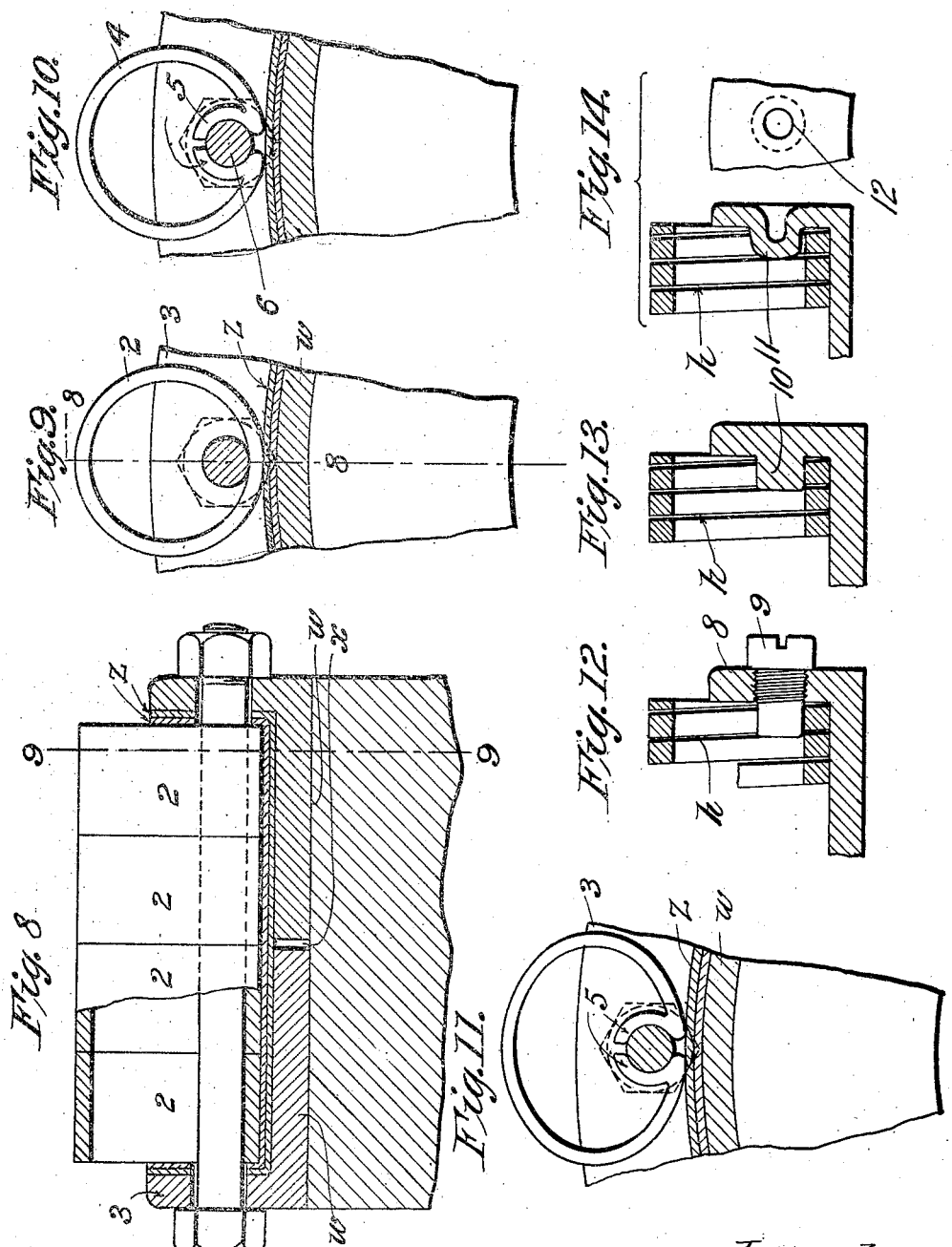

HARRY AUSTIN KNOX, OF SPRINGFIELD, MASSACHUSETTS.

VEHICLE-TIRE.

No. 888,823.　　　　Specification of Letters Patent.　　　Patented May 26, 1908.

Application filed December 13, 1905. Serial No. 291,623.

*To all whom it may concern:*

Be it known that I, HARRY A. KNOX, a citizen of the United States of America, residing at Springfield, in the county of Hampden and State of Massachusetts, have invented new and useful Improvements in Vehicle-Tires, of which the following is a specification.

This invention relates broadly to the class of vehicle tires and is adapted more particularly as an automobile tire and has for its object to provide a construction that can be manufactured at a comparatively low cost and is easy to assemble and can be quickly repaired in case of break-downs on the road.

Another object of the invention is to produce a construction that is more durable than any construction of tires now in use.

The invention broadly consists in placing a channel-iron on the felly of the wheel and locating in the bottom of the channel thereof one or more layers of semi-elastic material, such as belting, felt, or any analogous material, and in placing in the channel a series of coiled springs of any suitable form, the coils of the springs extending transversely or diagonally of the channel-iron, and in securing the spring by a bolt or other suitable means to the flanges of the channel-iron.

In the drawings forming part of this application,—Figure 1 is a vertical transverse section on line 1—1 of Fig. 2 of a wheel showing in section a portion of the felly, channel-iron, and spring, and the belting or fabric underneath the spring. Fig. 2 is a longitudinal sectional view on line 2—2 of Fig. 1. Fig. 3 is a sectional view showing the different forms of wire that may be used in making the transverse springs, as square, D-shaped, circular, or any other shape. Fig. 4 is a modification on the line 4—4 of Fig. 5 of the construction shown in Fig. 1 with a modified form of spring which is substantially triangular in shape and also showing a substitute means for the channel-iron for securing the spring to the rim of the wheel. Fig. 5 is a vertical section on the line 5—5 of Fig. 4 showing the modified form of spring and securing means. Fig. 6 shows the use of an elliptical spring secured to the rim in any suitable way, while Fig. 7 shows a spring that is rectangular in cross section, and Fig. 7ª shows a spring having a broader bearing and tread surface. Fig. 8 is a vertical section on the line 8—8 of Fig. 9 showing another modification wherein a cylindrical piece of tubing of any suitable metal, as steel or copper, and made either in one or more pieces, is employed for the tread of the wheel in place of the spring tread mentioned above. Fig. 9 is a vertical section on the line 9—9 of Fig. 8. Fig. 10 is a further modification of the cylindrical piece showing another means of securing the cylinder in the channel-iron, while Fig. 11 shows a longitudinal vertical section of an elliptical shaped cylinder for the tread of the wheels and having the same securing means as shown in Fig. 10. Figs. 12, 13 and 14 show modified constructions for securing the coiled spring in the channel-iron.

Referring to the drawings in detail, *a* designates the felly of the wheel; *b* the spokes; *c* a section of the channel-iron which is shrunk onto the rim of the wheel and may be further secured by bolts or screws; *d* the two layers of some semi-elastic material, as belting or any analogous material, as felt, cloth, etc. which is placed in the bottom of the channel-iron; *e* designates as a whole one of the coiled springs that extends transversely of the channel-iron and is of a diameter such that the springs extend above the side flanges *f, f* of the channel-iron.

It will be noticed that the normal longitudinal length of the spring *e* before the same is put under compression and placed in the channel-iron is greater than the internal width of the channel-iron from one flange to the other and is indicated by the dotted lines *g* in Fig. 1. It will be noticed that the individual coils of the spring *e* when placed under compression and put into the channel-iron do not quite touch each other, as indicated at *h*.

*i* designates a bolt that extends through openings *j* in the flanges of the channel-iron and is adapted for securely holding the spring *e* in place. The holes *j* are so located that when the bolt is inserted through the flanges *f* the bolt will be in close engagement with the inner lower surface of the springs *e*. By this construction the spring, when the wheel is in motion, can slightly rotate or have a slightly elastic movement on the bolt *i* as a center in a longitudinal direction of the channel-iron.

Referring to Fig. 2, it will be noticed that the springs *e* do not quite touch each other, as indicated by the reference letter *k*. The object of providing this space between the springs is that as the wheel rotates and the load is carried momentarily by each spring, the spring is permitted to slightly distend or compress in a longitudinal direction of the channel-iron and partially close the space $k$ between the springs, thus providing an elastic tread for the wheel, or if the springs $e$ do touch each other the elastic effect will be transmitted from one spring to the other.

The reference letter $m$ designates a series of holes that are drilled through the flanges of the channel-iron in order to permit the dirt and any loose material or water to escape that may work in between the springs $e$ through the space $k$.

Referring to the construction shown in Fig. 4, the letter $n$ designates the felly of the wheel; $o$ designates two plates that are bolted onto the sides of the felly by means of the bolt $p$. These plates $o$ extend above the rim of the wheel for a short distance, as shown, and through the extended portion of the plates is passed a bolt $q$ for securing the spring $r$ in place as described above. In this construction is shown a tire $s$ on the rim of the wheel, although it is not necessary to use the tire; the springs $r$ could be placed, if preferred, directly in contact with the periphery of the wooden rim or in contact with the steel channel-iron. The form of spring used in this construction may be the same as shown in Figs. 1 and 2 but that shown in Fig. 5 is one of the forms I may use, although I do not limit myself as to the form of spring I may use. One of the advantages of this form of spring is that the tread of the wheel conforms more nearly to a complete circle thus lessening in a measure the jarring effect of the wheel as it passes from one spring to the next. The form shown in Fig. 2 is more open.

The dotted line $t$ in Fig. 5 of the spring $r$ shows the position of the spring when under compression, and as it is bent by the weight upon it.

Fig. 6 shows another form of spring designated as $u$ which is substantially elliptical in cross section, and one of the advantages in using this form of spring is that it is better adapted for a light vehicle since it is more easily compressed than the forms described above.

Fig. 7 shows a spring $v$ that is rectangular in shape and in the figures shown is in the form of a square in cross section. This form of spring is not as elastic as the other form described and when they are put in place the openings between one spring and the next being V-shaped allows the corner of the spring to strike the road-bed and in this manner the elasticity of the spring is obtained.

Fig. 7$^a$ shows a spring $v'$ that has a broader tread and bearing surface than the other forms and is practically a circle with the top and bottom portions cut off.

Referring to Fig. 8, a modification of a channel-iron which is formed by two pieces of angle-iron designated by the reference letter $w$, is shown. These angle-irons are shrunk onto the rim of the wheel in the ordinary manner with a slight space $x$ between them. $z$ designates pieces of belting, felt, or any other material that is placed in the channel formed by the two angle-irons, and is carried up on the inner sides of the flanges of the angle-irons $w$ for the purpose of lessening the rattle that may result by reason of the circular tubes 2 which are used in this form when rubbing against the vertical flanges 3 of the angle-irons $w$, $w$. In this construction, in place of the elastic springs referred to above one or more metallic cylinders or tubes 2 are employed. It is of course understood that these cylinders 2 may be used with the one piece channel-iron in place of the spring $e$ shown in Figs. 1 and 2.

Referring to the construction shown in Fig. 10, a bifurcated cylinder 4 is shown with a modified means for securing the same in position in the channel-iron. The means employed in this construction consist of two semi-circular shaped pieces 5 that are integral with the body of the cylinder. These semi-circular shaped pieces have their concaved sides towards each other and through the openings formed by these two pieces 5 is passed the ordinary securing bolt 6.

Fig. 11 shows the same securing means described in reference to Fig. 10 but instead of the cylindrical tube being used, an elliptical bifurcated tube is used.

Fig. 12 shows a modification for securing the coiled springs shown in Figs. 1, 2, 4, 5, 6, and 7 in place. This modification consists in making a threaded opening 8 through the flange of the channel-iron and passing therethrough a short stud 9 the inner end of which engages the lower inner surface of the spring.

Fig. 13 shows another means of securing the spring in position which consists of a rolled or cast lug 10 on the inner surface of the channel-iron and is so positioned that the same engages the inner curved surface of the spring: while Fig. 14 shows another form of securing the spring in place by means of indenting the vertical flange of the channel-iron, as shown at 11, in vertical section and at 12 in side elevation.

Of course, it is understood that the springs $e$ may be made of any suitable elastic metal, as tempered copper, brass, etc., but tempered steel is generally employed in my improved tires. The belting I use in the bottom of the channel is placed loosely therein, and one piece is secured to the other by the ordinary belt fastener. This belting or analogous material necessarily deadens the metallic noise between the springs and rim and adds to the elastic tread of the wheel. The springs are not necessarily made in one piece, but may be made in two or more sections and held in place by the bolt through the flanges without connecting them together in any particular way.

Having thus described my invention, what I claim and desire to secure by Letters Patent of the United States, is:—

1. In a vehicle-wheel, the combination with the rim thereof, a channel-iron secured thereto, a series of springs extending transversely of said channel-iron, said springs being so placed as to form a space between one spring and the next, and a series of holes through the flanges of said channel-iron and located between said springs, and means for securing said springs to the channel-iron.

2. In a vehicle-wheel, the combination with the rim thereof, a channel-iron secured thereto, springs located transversely thereof and normally under compression but not great enough to bring the coils in contact with each other, and means for securing said springs to the flanges of the channel-iron, said securing means consisting of a series of projections adjacent the bottom of the channel-iron and engaging the lower, inner surface of the springs as described.

HARRY AUSTIN KNOX.

Witnesses:
  WM. H. CHAPIN,
  HARRY W. BOWEN.